United States Patent
Arlt et al.

(10) Patent No.: US 7,484,407 B2
(45) Date of Patent: Feb. 3, 2009

(54) METHOD AND DEVICE FOR DIAGNOSIS OF AN EXHAUST GAS CLEANING SYSTEM

(75) Inventors: Tino Arlt, Regensburg (DE); Krzysztof Korbel, Regensburg (DE); Gerd Rosel, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 59 days.

(21) Appl. No.: 11/666,003

(22) PCT Filed: Jul. 20, 2006

(86) PCT No.: PCT/EP2006/064458

§ 371 (c)(1),
(2), (4) Date: Apr. 20, 2007

(87) PCT Pub. No.: WO2007/012597

PCT Pub. Date: Feb. 1, 2007

(65) Prior Publication Data

US 2008/0105031 A1      May 8, 2008

(30) Foreign Application Priority Data

Jul. 26, 2005   (DE) .................. 10 2005 034 880

(51) Int. Cl.
*G01M 15/00*   (2006.01)
(52) U.S. Cl. .................................................. 73/114.75
(58) Field of Classification Search .............. 73/23.31, 73/23.32, 114.69, 114.71, 114.72, 114.73, 73/114.75
See application file for complete search history.

(56) References Cited

U.S. PATENT DOCUMENTS

| 5,233,829 | A | | 8/1993 | Komatsu |
| 5,335,538 | A | * | 8/1994 | Blischke et al. .......... 73/114.75 |
| 6,161,428 | A | * | 12/2000 | Esteghlal et al. ......... 73/114.75 |
| 6,629,453 | B1 | * | 10/2003 | Surnilla et al. ........... 73/114.73 |
| 6,662,638 | B2 | * | 12/2003 | Surnilla .................... 73/114.73 |
| 6,694,243 | B2 | * | 2/2004 | Shi et al. .................... 701/114 |
| 6,840,036 | B2 | * | 1/2005 | Fiengo et al. ................. 60/285 |
| 2003/0221415 | A1 | * | 12/2003 | Rosel et al. ................... 60/277 |
| 2004/0040286 | A1 | * | 3/2004 | Fiengo et al. ................. 60/285 |
| 2007/0203635 | A1 | * | 8/2007 | Schneider et al. ........... 701/101 |
| 2008/0092523 | A1 | * | 4/2008 | Ketterer et al. ............... 60/274 |

FOREIGN PATENT DOCUMENTS

| DE | 198 52 294 A1 | 5/2000 |
| DE | 103 13 331 A1 | 2/2005 |
| EP | 1 143 131 A2 | 10/2001 |
| EP | 1 457 654 A1 | 9/2004 |
| FR | 2 739 139 A1 | 3/1997 |

* cited by examiner

*Primary Examiner*—Eric S McCall

(57) ABSTRACT

The invention is distinguished by a method and a corresponding device for diagnosis of an individual catalytic converter of an exhaust gas purification unit assigned to an internal combustion engine in the Y configuration, despite the lack of exhaust gas probe between the individual catalytic converter and a main catalytic converter. The diagnosis proceeds on the basis of signals from the exhaust gas probes belonging to the exhaust gas purification unit. On the basis of these signals, the oxygen storage capacity of the individual catalytic converter is determined despite the lack of exhaust gas probe between the individual catalytic converter and the main catalytic converter.

17 Claims, 2 Drawing Sheets

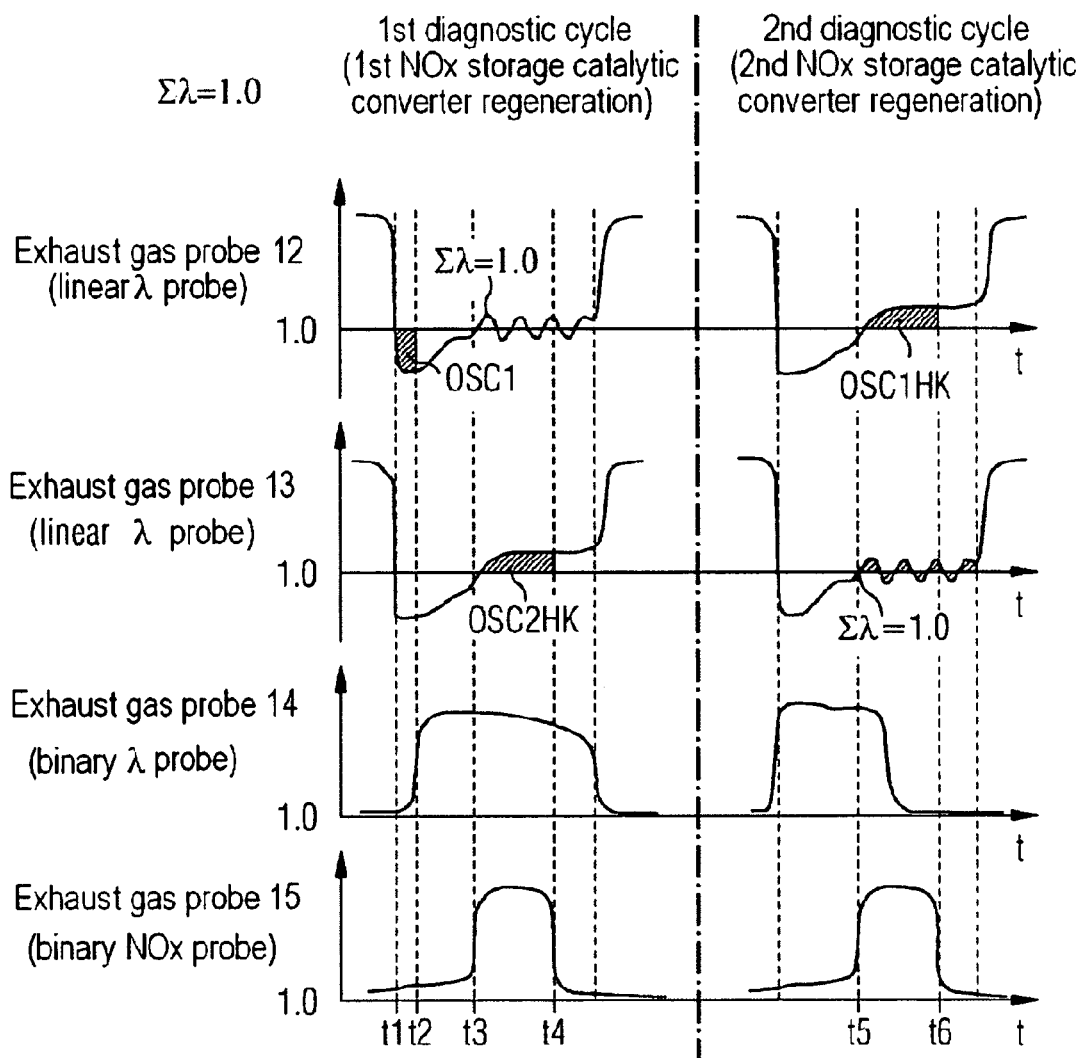

METHOD AND DEVICE FOR DIAGNOSIS OF AN EXHAUST GAS CLEANING SYSTEM

CROSS REFERENCE TO RELATED APPLICATIONS

This application is the US National Stage of International Application No. PCT/EP2006/064458, filed Jul. 20, 2006 and claims the benefit thereof. The International Application claims the benefits of German application No. 10 2005 034 880.7 filed Jul. 26, 2005, both of the applications are incorporated by reference herein in their entirety.

FIELD OF INVENTION

The present invention relates to a method and a device for diagnosis of an exhaust gas cleaning system.

BACKGROUND OF THE INVENTION

According to current legislation and statutory regulations, a self-monitoring function (on-board diagnosis) which monitors adherence to the maximum permissible emissions of hydrocarbons, carbon monoxide and nitrogen oxides is specified for new vehicles with an internal combustion engine. In order to comply with the legal requirements, different diagnosis functions are generally integrated within the engine management system of the internal combustion engine. Special importance is attached in this context in particular to the diagnosis of catalytic converters present in the exhaust gas tract of the internal combustion engine.

Methods for the diagnosis of catalytic converters are currently in general use in which the oxygen storage capacity (OSC) of the catalytic converter is determined and used as a measure for the ability of the catalytic converter to convert hydrocarbons, carbon monoxide and nitrogen oxides. The core of OSC-based catalytic converter diagnosis is determining the ability of the catalytic converter to store oxygen. For this purpose a balance is typically kept of oxygen volumes which flow into or, as the case may be, flow out of the catalytic converter in a defined period of time. At the same time it must be ensured by means of suitable measures that the volume of oxygen already stored in the catalytic converter does not give rise to any errors when determining the OSC.

A common feature of all currently known methods for determining the OSC is that they require an exhaust gas probe upstream and an exhaust gas probe downstream of the catalytic converter that is to be diagnosed. If one of these exhaust gas probes is not present, it is not possible to diagnose the catalytic converter on the basis of the oxygen storage capacity. In particular for exhaust gas cleaning systems in a Y configuration, variants can occur in which exhaust gas probes are not provided upstream and downstream of all the catalytic converters which are present. With a first exhaust manifold and a second exhaust manifold, exhaust gas cleaning systems in a Y configuration have two exhaust manifolds, to which a first individual catalytic converter and a second individual catalytic converter are assigned respectively. Downstream of the individual catalytic converters the exhaust gas comes together in a common exhaust pipe. Further downstream the common exhaust pipe opens into a main catalytic converter.

In order to determine the oxygen storage capacity of all three catalytic converters of an exhaust gas cleaning system in Y configuration with the methods which are conventionally used, five exhaust gas probes are needed: one exhaust gas probe upstream of each of the individual catalytic converters and between each of the individual catalytic converters and the main catalytic converter, as well as downstream of the main catalytic converter. For reasons of cost it may be necessary to dispense with one exhaust gas probe between an individual catalytic converter and the main catalytic converter. The oxygen storage capacity of this individual catalytic converter cannot then be determined by means of the methods which are conventionally used.

SUMMARY OF INVENTION

The object of the invention is to provide a method and a device by means of which the diagnosis of an individual catalytic converter of an exhaust gas cleaning system in a Y configuration can be made possible, despite a lack of an exhaust gas probe between the individual catalytic converter and a main catalytic converter.

The object is achieved by the features of the independent claims. Advantageous embodiments of the invention are characterized in the dependent claims.

The invention is characterized by a method and a corresponding device for diagnosing an individual catalytic converter of an exhaust gas cleaning system in a Y configuration, despite the lack of an exhaust gas probe between the individual catalytic converter (referred to in the following text as the second individual catalytic converter) and a main catalytic converter, wherein the diagnosis is carried out on the basis of the signals from the exhaust gas probes associated with the exhaust gas cleaning system. With regard to the method, the oxygen storage capacity of the other individual catalytic converter present in the exhaust gas cleaning system (referred to in the following text as the first individual catalytic converter) is determined on the basis of the signals from two exhaust gas probes by means of the known method, whereby one exhaust gas probe is located upstream and another exhaust gas probe is located between the first individual catalytic converter and the main catalytic converter.

Furthermore, the sum of the oxygen storage capacities of the first individual catalytic converter and the main catalytic converter is determined on the basis of the signals of the exhaust gas probe upstream of the first individual catalytic converter and the signals of an exhaust gas probe downstream of the main catalytic converter. Moreover, the sum of the oxygen storage capacities of the second individual catalytic converter and the main catalytic converter are determined on the basis of the signals of an exhaust gas probe upstream of the second individual catalytic converter and the signals of the exhaust gas probe downstream of the main catalytic converter. The oxygen storage capacity of the second individual catalytic converter is determined on the basis of the oxygen storage capacity of the first individual catalytic converter, the sum of the oxygen storage capacities of the first individual catalytic converter and the main catalytic converter and the sum of the oxygen storage capacities of the second individual catalytic converter and the main catalytic converter. The diagnosis of the second individual catalytic converter is performed by means of the oxygen storage capacity.

The method has the advantage that a diagnosis of the second individual catalytic converter can take place despite a lack of exhaust gas probe between the second individual catalytic converter and the main catalytic converter. This means that the exhaust gas cleaning system can be implemented at low cost by dispensing with an exhaust gas probe. Furthermore, the method means that it is possible to determine the oxygen storage capacity of the second catalytic converter even if its oxygen storage capacity is very much less than that of the main catalytic converter.

In an advantageous embodiment of the invention, the oxygen storage capacity of the second individual catalytic converter is determined according to the following formula:

$$OSC2 = OSC1 + OSC2HK - OSC1HK,$$

where OSC2 is the oxygen storage capacity of the second individual catalytic converter, OSC1 the oxygen storage capacity of the first individual catalytic converter, OSC2HK the sum of the oxygen storage capacities of the second individual catalytic converter and the main catalytic converter, and OSC1HK is the sum of the oxygen storage capacities of the first individual catalytic converter and the main catalytic converter. In addition to a simple calculation of the oxygen storage capacity of the second individual catalytic converter, the forming of the difference between the terms OSC2HK and OSC1HK produces yet a further advantage. The forming of the difference reduces the influence of errors during the measuring of the signals of the exhaust gas probes and errors of the exhaust gas probes on the determination of the oxygen storage capacity. Offset errors of linear lambda probes, errors caused by the switching delay of binary lambda probes or errors when determining the volumetric air flow can be cited as possible errors in this connection.

In a further advantageous embodiment of the invention, the second individual catalytic converter is operated with a stoichiometric exhaust gas during the determination of OSC1HK(lambda=1.0). This ensures that no oxygen is carried into or out of the main catalytic converter via the second individual catalytic converter, which would lead to falsification of the determination of OCS1HK.

Alternatively, the determination of the oxygen storage capacity of the second individual catalytic converter can also be performed by means of a slightly modified method. For this alternative method, the oxygen storage capacity of the main catalytic converter is determined on the basis of the signals of the exhaust gas probe between the first individual catalytic converter and the main catalytic converter and the signals of the exhaust gas probe downstream of the main catalytic converter. Furthermore, the sum of the oxygen storage capacities of the second individual catalytic converter and the main catalytic converter is determined on the basis of the signals of the exhaust gas probe upstream of the second individual catalytic converter and the signals of the exhaust gas probe downstream of the main catalytic converter. The oxygen storage capacity of the second individual catalytic converter is determined on the basis of the oxygen storage capacity of the main catalytic converter and the sum of the oxygen storage capacities of the second individual catalytic converter and the main catalytic converter.

In an advantageous embodiment of this alternative method, the oxygen storage capacity of the second individual catalytic converter is determined according to the following formula:

$$OSC2 = OSC2HK - OSCHK,$$

where OSC2 is the oxygen storage capacity of the second catalytic converter, OSC2HK is the sum of the oxygen storage capacities of the second individual catalytic converter and the main catalytic converter, and OSCHK is the oxygen storage capacity of the main catalytic converter. This formula allows simple calculation of the oxygen storage capacity of the second individual catalytic converter. Furthermore, because of the forming of the difference, the influence of errors during the measurement of signals of the exhaust gas probes and errors of the exhaust gas probes on the determination of the oxygen storage capacity is diminished.

In a further advantageous embodiment of the invention, the first individual catalytic converter is operated with a stoichiometric exhaust gas during the determination of OSC2HK (lambda=1.0). This ensures that no oxygen is carried into or out of the main catalytic converter via the first individual catalytic converter, thus falsifying the determination of OCS2HK.

In a further advantageous embodiment of the invention, the individual oxygen storage capacities (OSC1, OSC1HK, OSC2HK, OSCHK) are determined by varying the lambda value of the exhaust gas in the corresponding catalytic converters by means of targeted measures in such a way that an oscillating waveform is produced around the value lambda=1.0. The oscillation parameters (curve shape, amplitude, cycle period) are selected in such a way that a considerably higher oxygen loading occurs as opposed to normal operation (oxygen volume which has to be alternately stored or discharged). From the waveform of the signals of the corresponding exhaust gas probe it must be possible to record a response which enables the respective oxygen storage capacity to be calculated.

In a further advantageous embodiment, the individual oxygen storage capacities (OSC1, OSC1HK, OSC2HK, OSCHK) are determined by varying the lambda value of the exhaust gas abruptly by means of suitable measures around the value lambda=1.0. In this embodiment the lambda stimulation is implemented by means of lambda jumps (e.g. from lambda=0.95 to lambda=1.05 and from lambda=1.05 to lambda=0.95). Furthermore, varying the parameters amplitude and stimulation period is usually dispensed with. The oxygen storage capacity of the catalytic converter is determined through keeping a balance of the oxygen volume carried into or out of the catalytic converter over the period from the start of the lambda jump through to the establishment of a response at the corresponding exhaust gas probe downstream of the catalytic converter.

In a further advantageous embodiment, the method is applied to an internal combustion engine which mainly operates in super-stoichiometric mode (lean operation). In this mode of operation large volumes of nitrogen oxides are generated, thus necessitating efficient cleaning of the exhaust gas. Efficient cleaning can be ensured by means of an exhaust gas cleaning system in a Y configuration.

In a further advantageous embodiment, the first and the second individual catalytic converters are implemented as three-way catalytic converters and the main catalytic converter is embodied in the form of a NOx storage catalytic converter. With this configuration, nitrogen oxides in the exhaust gas can be reduced in a particularly effective way.

In a further advantageous embodiment, the individual storage capacities (OSC1, OSC1HK, OSC2HK, OSCHK) are determined on the basis of the signals of the exhaust gas probes which are captured during a regeneration phase of the NOx storage catalytic converter. The lambda value of the exhaust gas is changed abruptly for the purpose of regenerating the NOx storage catalytic converter. These jumps can be used in order to determine the oxygen storage capacities. This means that the oxygen storage capacity can be determined without the additional emissions caused by the catalytic converter diagnosis and without additional fuel being consumed for the purpose of the determination.

In a further advantageous embodiment, the oxygen storage capacities OSC1HK and OSC2HK are determined at the end of a regeneration of the NOx storage catalytic converter. This eliminates the influence of the nitrogen oxides stored in the NOx storage catalytic converter on the determination of the oxygen storage capacities.

In a further advantageous embodiment, the lambda value of the exhaust gas flowing through the first individual catalytic converter is selected to be correspondingly lean (e.g. lambda>1.05) during the determination of OSC1HK so that the NOx storage catalytic converter is placed in a state in which to be able to again store the nitrogen oxides contained in the exhaust gas. This ensures that no additional nitrogen oxide emissions are produced as a result of determining OSC1HK.

In a further advantageous embodiment, the lambda value of the exhaust gas flowing through the second individual catalytic converter is selected to be correspondingly lean (e.g. lambda>1.05) during the determination of OSC2HK so that the NOx storage catalytic converter is placed in a state in which to be able again to store the nitrogen oxides contained in the exhaust gas. This ensures that no additional nitrogen oxide emissions are produced as a result of determining OSC2HK.

In a further advantageous embodiment, the first individual catalytic converter is operated with a slightly super-stoichiometric exhaust gas (e.g. 1.0<lambda<1.01) during the determination of OSC2HK. The result of this is that the first individual catalytic converter is slowly filled with oxygen. Filling must proceed slowly in order to ensure that no oxygen from the first individual catalytic converter falsifies the results during the determination of OSC2HK. Fulfillment of this requirement can be monitored by means of the exhaust gas probe which is positioned between the first individual catalytic converter and the NOx storage catalytic converter. When the determination of OSC2HK has been completed, the determination of OSC1 can be concluded rapidly. The advantage of determining OSC1 in accordance with this embodiment consists in a lessening of the influence of measuring errors of the exhaust gas probes due to dynamic processes, as the process runs more slowly as opposed to the determination of OSC1 during a regeneration of the NOx storage catalytic converter.

In a further advantageous embodiment, the exhaust gas probes are implemented upstream of the first and second catalytic converter in the form of linear lambda exhaust gas probes. The exhaust gas probe between the first individual catalytic converter and the main catalytic converter is implemented in the form of a binary lambda exhaust gas probe. Furthermore, the exhaust gas probe downstream of the main catalytic converter is implemented in the form of a binary lambda exhaust gas probe or as a NOx exhaust gas probe with lambda signal output. This configuration makes possible efficient determination of the oxygen storage capacities.

BRIEF DESCRIPTION OF THE DRAWINGS

Exemplary embodiments of the invention are described in the following with reference to the schematic drawings, in which.

DETAILED DESCRIPTION OF INVENTION

Figure 1:
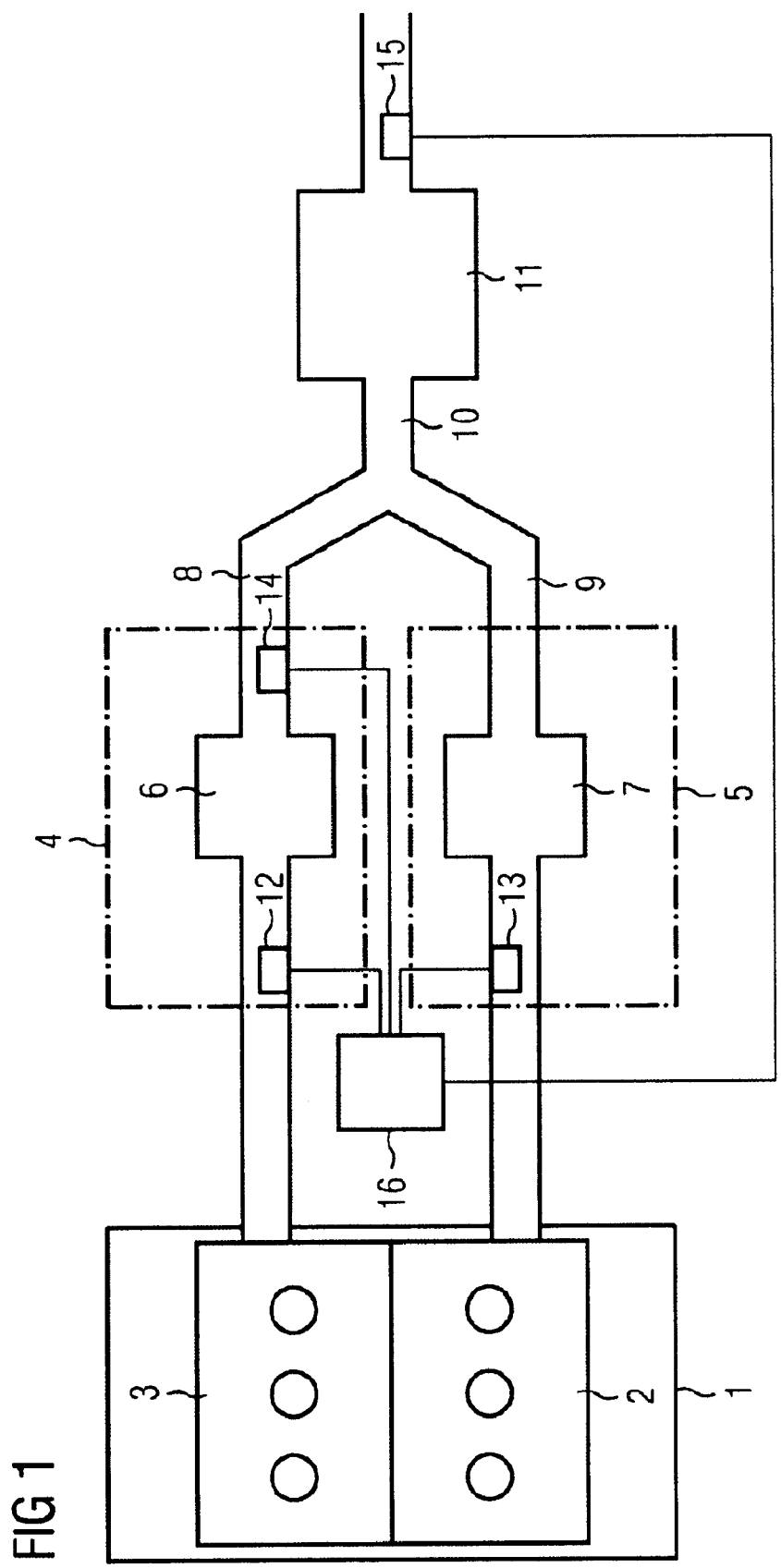
FIG. 1 shows an exhaust gas cleaning system of an internal combustion engine in a Y configuration and FIG. 2 variations in the signals from exhaust gas probes over time in order to illustrate the method according to the invention.

FIG. 1 shows an exhaust gas system in a Y configuration associated with an internal combustion engine 1. The internal combustion engine 1 has two cylinder banks 2, 3. An exhaust manifold 5 is assigned to the cylinder bank 2 and an exhaust manifold 4 is assigned to the cylinder bank 3 for cleaning of the exhaust gas generated by the cylinder bank 2, 3 respectively. Furthermore, the exhaust manifold 4 includes an individual catalytic converter 6 and the exhaust manifold 5 includes an individual catalytic converter 7 for cleaning of the exhaust gases generated in the respective cylinder banks 2, 3. Downstream, exhaust pipes 8, 9 of the exhaust manifolds 4, 5 converge into a common exhaust pipe 10. The common exhaust pipe opens into a main catalytic converter 11. The main catalytic converter 11 serves for removing pollutants from the exhaust gas which can be only inadequately removed with the individual catalytic converters 6, 7. For example, the main catalytic converter 11 can be implemented as a NOx storage catalytic converter 11 and the individual catalytic converters 6, 7 can be implemented as three-way catalytic converters.

Furthermore, the exhaust gas cleaning system has an exhaust gas probe 12 upstream of a first individual catalytic converter 6, an exhaust gas probe 13 upstream of a second individual catalytic converter 7, an exhaust gas probe 14 between the first individual catalytic converter 6 and the main catalytic converter 11 and an exhaust gas probe 15 downstream of the main catalytic converter 11. The exhaust gas probes 12, 13, 14, 15 can be implemented for example as linear or binary lambda probes. The signals of the exhaust gas probes 12, 13, 14, 15 are captured by an electronic computing unit 16. On the basis of the signals it is possible to regulate the air-fuel mixture supplied to the internal combustion engine 1, to regenerate individual catalytic converters or to determine the oxygen storage capacities of individual catalytic converters. No exhaust gas probe is present between the second individual catalytic converter 7 and the main catalytic converter 11. Nevertheless, the method according to the invention allows the determination of the oxygen storage capacity of the second individual catalytic converter 7.

In order to clarify the method according to the invention, FIG. 2 shows the variations in the signals of the exhaust gas probes 12, 13, 14, 15 over time. In this example, the internal combustion engine 1 operates mainly in super-stoichiometric mode (lean operation). Accordingly, the main catalytic converter 11 is implemented in the form of a NOx storage catalytic converter and the individual catalytic converters 6, 7 are implemented in the form of three-way catalytic converters. Furthermore, the exhaust gas probes 12, 13 upstream of the two individual catalytic converters 6, 7 are implemented in the form of linear lambda probes and the exhaust gas probe 14 between the first individual catalytic converter 6 and the NOx storage catalytic converter is implemented as a binary lambda probe. The exhaust gas probe 15 downstream of the NOx storage catalytic converter is implemented in the form of a binary lambda probe or as a NOx sensor with lambda signal output. The diagnosis of the exhaust gas cleaning system is carried out by means of two diagnostic cycles, with abrupt changes in the progression of the lambda value of the exhaust gas, caused by regeneration of the NOx storage catalytic converter, being used for the diagnosis within the individual diagnostic cycles. This results in the advantage that the diagnosis of the, exhaust gas cleaning system is carried out without additional emissions caused by the catalytic converter diagnosis, and that only a minimal amount of additional fuel is required for the diagnosis.

At the start of the first diagnostic cycle, (first regeneration of the NOx storage catalytic converter), the lambda value of the exhaust gas of both exhaust manifolds 4, 5 is suddenly changed from lambda>1.5 to lambda≈0.8 at point in time t1. The sudden change reveals itself in the shape of the signals of the linear exhaust gas probes 12, 13 upstream of the two individual catalytic converters 6, 7. At point in time t1, all the catalytic converters are saturated with oxygen because of the lean operation of the internal combustion engine 1. The switchover to rich operation leads to the oxygen which is stored in the two individual catalytic converters 6, 7 being discharged and used for oxidation of the hydrocarbons and carbon monoxides which are present in the exhaust gas. As soon as the oxygen stored in the individual catalytic converters 6, 7 has been consumed, the rich exhaust gas flows through the two individual catalytic converters 6, 7 without being influenced. This state is shown by the binary exhaust gas probe 14 between the first individual catalytic converter 6 and the NOx storage catalytic converter at point in time t2. The oxygen storage capacity of the first catalytic converter 6 can now be determined with the aid of an oxygen balance determination. It can be determined by means of the area shown in FIG. 2 which includes the signal of the exhaust gas probe 12 upstream of the first individual catalytic converter 6 between points in time t1 and t2 with the straight line parallel to the time axis through the point lambda=1.

After the oxygen in the individual catalytic converters 6, 7 has been consumed, the rich exhaust reaches the NOx storage catalyst. Here, the stored oxygen and the stored nitrogen oxides are now released. The oxygen is again used directly for oxidation of the hydrocarbons and carbon monoxides contained in the exhaust gas. The stored nitrogen oxides are first reduced to nitrogen and oxygen. The oxygen which results is made use of again immediately for oxidation of the hydrocarbons and carbon monoxides. After all the oxygen stored in the catalytic converters has been consumed, the rich exhaust gas can no longer be further oxidized. This leads to what is termed the rich breakthrough, which is indicated by the lambda signal of the exhaust gas probe 15 downstream of the NOx storage catalytic converter at point in time t3. This point in time identifies the end of the first regeneration of the NOx storage catalytic converter.

Keeping an oxygen balance of the entire oxygen clearing process of all catalytic converters of the exhaust gas cleaning system yields a stored volume of oxygen. This stored oxygen volume is not, however, representative of the condition of the catalytic converter, since the stored volume of nitrogen oxides is also contained therein. For this reason the influence of the nitrogen oxides stored in the NOx storage catalytic converter has to be eliminated when determining OSC1HK and OSC2HK. Therefore OSC1HK and OSC2HK are determined at the end of a regeneration of the NOx storage catalytic converter. During the first diagnostic cycle, a first exhaust manifold 4 is operated with a stoichiometric exhaust gas (Lambda=1.0) as from point in time t3 for the determination of OSC2HK. This operation can be carried out with a constant lambda or with an oscillating progression of the lambda value, the average of which results in lambda=1.0. FIG. 2 shows the operation with an oscillating progression of the lambda value and this operation can be seen in the shape of the signal of the linear exhaust gas probe 12. A second exhaust manifold 5 is operated with lean exhaust gas, the lambda value of the exhaust gas having a defined value. Following this is a period of waiting while the second individual catalytic converter 7 and the NOx storage catalytic converter are completely filled with oxygen. The end of this process is indicated by means of the lambda signal of the exhaust gas probe 15 downstream of the NOx storage catalytic converter at point in time t4. OSC2HK is determined by means of an oxygen balance. OSC2HK can be determined by means of the area shown in FIG. 2 which includes the signal of the exhaust gas probe 13 upstream of the second catalytic converter 7 between points in time t3 and t4 with the straight line parallel to the time axis through point lambda=1.

The signals of the exhaust gas probes 12, 13, 14, 15 during the subsequent regeneration of the NOx storage catalytic converter are used for the second diagnostic cycle. In this case the roles of the exhaust manifolds 4, 5 are reversed, i.e. as from point in time t5, the second exhaust manifold 5 is operated with a stoichiometric exhaust gas (lambda=1.0). The first exhaust manifold 4 is operated with lean exhaust gas as from this point in time, the lambda value of the exhaust gas having a defined value. Following this is a period of waiting while the first individual catalytic converter 6 and the NOx storage catalytic converter are completely filled with oxygen. The end of this process is indicated by means of the lambda signal of the exhaust gas probe 15 downstream of the NOx storage catalytic converter at point in time t6. OSC1HK is determined by means of an oxygen balance determination. OSC1HK can be determined by means of the area shown in FIG. 2 which includes the signal of the exhaust gas probe 12 upstream of the first catalytic converter 6 between points in time t5 and t6 with the straight line parallel to the time axis through point lambda=1.

It is now possible to determine OSC2 using the formula $$OSC2=OSC1+OSC2HK-OSC1HK.$$

In selecting the lean lambda value for determining OSC2HK and OSC1HK it should be ensured that the lambda value of the exhaust gas is selected in such a way that the NOx storage catalytic converter is already able to store the nitrogen oxides contained in the exhaust again (e.g. lambda>1.05). In this means no additional nitrogen oxide emissions are produced during the determination of the oxygen storage capacities.

The invention claimed is:

1. A method for diagnosis of an exhaust gas cleaning system incorporated in an exhaust tract of an internal combustion engine having a first exhaust manifold a second exhaust manifold and includes a first individual catalytic converter associated with the first exhaust manifold and a second individual catalytic converter associated with the second exhaust manifold, the exhaust pipes of the first and second manifolds converge into a common exhaust pipe downstream of the two individual catalytic converters, a main catalytic converter located downstream of the common exhaust pipe, an exhaust gas probe arranged upstream of the first individual catalytic converter, an exhaust gas probe arranged upstream of the second individual catalytic converter, an exhaust gas probe arranged between the first individual catalytic converter and the main catalytic converter, and an exhaust gas probe arranged downstream of the main catalytic converter, comprising:

determining an oxygen storage capacity of the first individual catalytic converter based on signals of the exhaust gas probe upstream of the first individual catalytic converter and signals of the exhaust gas probe between the first individual catalytic converter and the main catalytic converter;

determining a sum of the oxygen storage capacities of the first individual catalytic converter and main catalytic converter based on signals of the exhaust gas probe upstream of the first individual catalytic converter and signals of the exhaust gas probe downstream of the main catalytic converter;

determining a sum of the oxygen storage capacities of the second catalytic converter and the main catalytic converter based on signals of the exhaust gas probe upstream of the second individual catalytic converter and signals of the exhaust gas probe downstream of the main catalytic converter; and determining an oxygen storage capacity of the second individual catalytic converter based on the oxygen storage capacity of the first individual catalytic converter, the sum of the oxygen storage capacities of the first individual catalytic converter and the main catalytic converter, and the sum of the oxygen storage capacities of the second individual catalytic converter and the main catalytic converter.

2. The method as claimed in claim 1, wherein the oxygen storage capacity of the second individual catalytic converter is determined in accordance with the following equation:

$$OSC2 = OSC1 + OSC2HK - OSC1HK,$$

where:
- OSC2 is the oxygen storage capacity of the second individual catalytic converter,
- OSC1 is the oxygen storage capacity of the first individual catalytic converter,
- OSC2HK is the sum of the oxygen storage capacities of the second individual catalytic converter and the main catalytic converter, and
- OSC1HK is the sum of the oxygen storage capacities of the first individual catalytic converter and the main catalytic converter.

3. The method as claimed in claim 2, wherein the second individual catalytic converter is operated with a stoichiometric exhaust gas during the determination of the sum of the oxygen storage capacities of the first catalytic converter and the main catalytic converter.

4. A method for diagnosis of an exhaust gas cleaning system incorporated in an exhaust tract of an internal combustion engine having a first exhaust manifold and a second exhaust manifold, including a first individual catalytic converter associated with the first exhaust manifold and a second individual catalytic converter associated with the second exhaust manifold, the exhaust pipes of the first and second manifolds converge into a common exhaust pipe downstream of the two individual catalytic converters, a main catalytic converter located downstream of the common exhaust pipe, an exhaust gas probe arranged upstream of the first individual catalytic converter, an exhaust gas probe arranged upstream of the second individual catalytic converter, an exhaust gas probe arranged between the first individual catalytic converter and the main catalytic converter, and an exhaust gas probe arranged downstream of the main catalytic converter, comprising:
determining an oxygen storage capacity of the main catalytic converter based on signals of the exhaust gas probe between the first catalytic converter and the main catalytic converter and signals of the exhaust gas probe downstream of the main catalytic converter;
determining a sum of the oxygen storage capacities of the second individual catalytic converter and the main catalytic converter based on the signals of the exhaust gas probe upstream of the second individual catalytic converter and the signals of the exhaust gas probe downstream of the main catalytic converter; and
determining an oxygen storage capacity of the second individual catalytic converter based on the oxygen storage capacity of the main catalytic converter and the sum of the oxygen storage capacities of the second individual catalytic converter and the main catalytic converter.

5. The method as claimed in claim 4, wherein the oxygen storage capacity of the second individual catalytic converter is determined in accordance with the following equation:

$$OSC2 = OSC2HK - OSCHK,$$

where OSCHK is the oxygen storage capacity of the main catalytic converter.

6. The method as claimed in claim 5, wherein the first individual catalytic converter is operated with a stoichiometric exhaust gas during the determination of the sum of the oxygen storage capacities of the second catalytic converter and the main catalytic converter.

7. The method as claimed in claim 6, wherein the individual oxygen storage capacities of the catalytic converters for which the oxygen storage capacities are to be determined are operated with exhaust gas whose lambda value has an oscillating variation over time around the value lambda=1.0.

8. The method as claimed in claim 6, wherein the individual oxygen storage capacities are determined in that the catalytic converters for which the oxygen storage capacities are to be determined are operated with exhaust gas whose lambda value is changed abruptly.

9. The method as claimed in claim 8, wherein the engine mostly operates in a super-stoichiometric mode.

10. The method as claimed in claim 9, wherein the two individual catalytic converters are three-way catalytic converters and the main catalytic converter is a NOx storage catalytic converter.

11. The method as claimed in claim 10, wherein the determination of individual oxygen capacities is based on the signals of the exhaust gas probes captured during a regeneration of the NOx storage catalytic converter.

12. The method as claimed in claim 11, wherein the sum of the oxygen storage capacities of the first individual catalytic converter and the main catalytic converter and the sum of the oxygen storage capacities of the second individual catalytic converter and the main catalytic converter are determined at the end of a regeneration phase of the NOx storage catalytic converter.

13. The method as claimed in claim 12, wherein during the determination of the sum of the oxygen storage capacities of the first individual catalytic converter and the main catalytic converter the lambda value of the exhaust gas flowing through the first individual catalytic converter is correspondingly selected in such that the NOx storage catalytic converter is placed in a state able to store the nitrogen oxides contained in the exhaust gas.

14. The method as claimed in claim 12, wherein during the determination of the sum of the oxygen storage capacities of the second individual catalytic converter and the main catalytic converter, the lambda value of the exhaust gas flowing through the second individual catalytic converter is selected such that the NOx storage catalytic converter is placed in a state able to store the nitrogen oxides contained in the exhaust gas.

15. The method as claimed in claim 14, wherein the first individual catalytic converter is operated with a some what super-stoichiometric exhaust gas during the determination of the sum of the oxygen storage capacities of the second individual catalytic converter and the main catalytic converter.

16. The method as claimed in claim 15, wherein the exhaust gas probes arranged upstream of the two individual catalytic converters are linear lambda exhaust gas probes, the exhaust gas probe arranged between the first catalytic converter and the main catalytic converter is a binary lambda exhaust gas probe, and the exhaust gas probe arranged downstream of the main catalytic converter is a binary lambda exhaust gas probe or a NOx exhaust gas probe with lambda signal output.

17. A device for diagnosis of an exhaust gas cleaning system incorporated in the exhaust tract of an internal combustion engine, which system has a first exhaust manifold and a second exhaust manifold and which includes a first individual catalytic converter associated with the first exhaust manifold and a second individual catalytic converter associated with the second exhaust manifold, the exhaust pipes of the first and second exhaust manifolds converge into a common exhaust pipe downstream of the two catalytic converters, a main catalytic converter arranged downstream of the common exhaust pipe, an exhaust gas probe arranged upstream of the first individual catalytic converter, an exhaust gas probe arranged upstream of the second individual catalytic converter, an exhaust gas probe arranged between the first individual catalytic converter and the main catalytic converter, and an exhaust gas probe arranged downstream of the main catalytic converter, comprising:

a first determining device that determines the oxygen storage capacity of the first catalytic converter based on the signals of the exhaust gas probe upstream of the first individual catalytic converter and the signals of the exhaust gas probe between the first individual catalytic converter and the main catalytic converter;

a first sum determining device that determines the sum of the oxygen storage capacities of the first individual catalytic converter and the main catalytic converter based on the signals of the exhaust gas probe upstream of the first individual catalytic converter and the signals of the exhaust gas probe downstream of the main catalytic converter;

a second sum determining device that determines the sum of the oxygen storage capacities of the second individual catalytic converter and the main catalytic converter based on the signals of the exhaust gas probe upstream of the second individual catalytic converter and the signals of the exhaust gas probe downstream of the main catalytic converter; and a capacity determining device that determines the oxygen storage capacity of the second individual catalytic converter based on the oxygen storage capacity of the first individual catalytic converter, the sum of the oxygen storage capacities of the first individual catalytic converter and the main catalytic converter, and the sum of the oxygen storage capacities of the second catalytic converter and the main catalytic converter.

* * * * *